G. D. PARKER.
BOX MAKING MACHINE.
APPLICATION FILED MAY 2, 1904.

980,431.

Patented Jan. 3, 1911.

WITNESSES

INVENTOR.
George D. Parker.
by Hazard & Harpham
ATTORNEYS

G. D. PARKER.
BOX MAKING MACHINE.
APPLICATION FILED MAY 2, 1904.

980,431.

Patented Jan. 3, 1911.

WITNESSES

INVENTOR
George D. Parker.
BY Hazard & Harpham
ATTORNEYS.

G. D. PARKER.
BOX MAKING MACHINE.
APPLICATION FILED MAY 2, 1904.

980,431.

Patented Jan. 3, 1911.
5 SHEETS—SHEET 3.

Witnesses
Milton C. Lenoir
Ralph S. Warfield

Inventor
George D. Parker
by Vernon E. Hodges
Associate Attorney

G. D. PARKER.
BOX MAKING MACHINE.
APPLICATION FILED MAY 2, 1904.

980,431.

Patented Jan. 3, 1911.

Witnesses

Inventor
George D. Parker
by Vernon E. Hodges
Associate Attorney

UNITED STATES PATENT OFFICE.

GEORGE D. PARKER, OF RIVERSIDE, CALIFORNIA.

BOX-MAKING MACHINE.

980,431.  Specification of Letters Patent.  Patented Jan. 3, 1911.

Application filed May 2, 1904. Serial No. 206,071.

*To all whom it may concern:*

Be it known that I, GEORGE D. PARKER, a citizen of the United States, residing at Riverside, in the county of Riverside and State of California, have invented new and useful Improvements in Box-Making Machines, of which the following is a specification.

My invention relates to machines for making boxes and the apparatus selected for illustration is especially intended for the manufacture of boxes such as are used in shipping oranges.

The general object of the invention is to provide a machine that will automatically and rapidly produce boxes so long as it is supplied with proper stock from which such boxes may be formed. The different parts of the boxes are placed in suitable hoppers and the two end pieces and an intermediate partition piece are fed, edgewise, into the machine and clamped in proper position; pieces for one side of the box are then placed in position and nailed to the end and partition pieces; the parts' thus connected are turned 90° while the end and partition pieces are still clamped; a second set of side pieces is added; the structure is again turned 90° and a third side is added; and the box being now completed, except as to the cover, which is, later, added by hand, is ejected from the machine. The whole operation is automatic and is repeated indefinitely.

In the accompanying drawings.

In the drawings, 1, 1 represent four upright frame pieces supported upon a base $1^b$ and bent outward at $1^a$ to afford more space for operative parts.

The machine is actuated by a power shaft 3 mounted in bearings $3^a$ and provided with a belt pulley 4 to be driven from any suitable source of power, and engaged with the shaft by any suitable clutch B, shown as operated by a lever C rotating, in its bearings $c$, a rod $b$ provided with an arm $d$ engaging the clutch mechanism. The shaft is provided with a suitable band brake D, operated (by devices not shown) to resist motion when the clutch is disengaged. The shaft 3 carries a pinion 5 which engages a gear 6 upon a parallel shaft 7 and rotates the latter at a reduced speed. Through gears 8, 9, the shaft 7 rotates at one third its own speed a parallel counter shaft 10, mounted in bearings 10' upon brackets $10^a$. Upon the frame are secured devices E, without novelty, for feeding nails to the nailing head 2 which reciprocates on rails $2^a$ on the standards 1 and is actuated by the shaft 7 through eccentrics 12, cranks 13, and connecting rods 14 provided with turnbuckles $14^a$ and attached to studs $2^b$ upon the nailing head.

Figure 3:
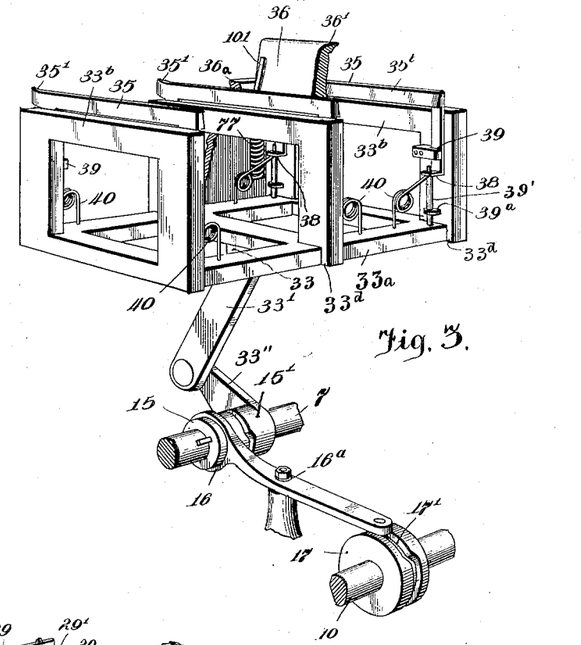
Fig. 3 is a perspective view of a certain elevator and its connections.

The end and partition pieces are fed from hoppers in the rear of the machine, a set of three pieces, in this instance, being simultaneously pushed edgewise into the proper relative positions upon an elevating device which then raises them to position upon yielding nailing bases, where they are clamped in position to receive the proper side pieces fed to position from another source. The base of the elevator consists of a horizontal rectangular frame, $33^a$, whose angles fit, respectively, in ways in the standards 1 and which normally rests upon crossbars $1^d$ between the standards. From this base rise vertical members $33^b$ which project beyond the rear of the base, at $33^d$ (Fig. 3) and which receive upon their plane horizontal upper edges, respectively, the vertical end and partition pieces of each box.

Figure 2:
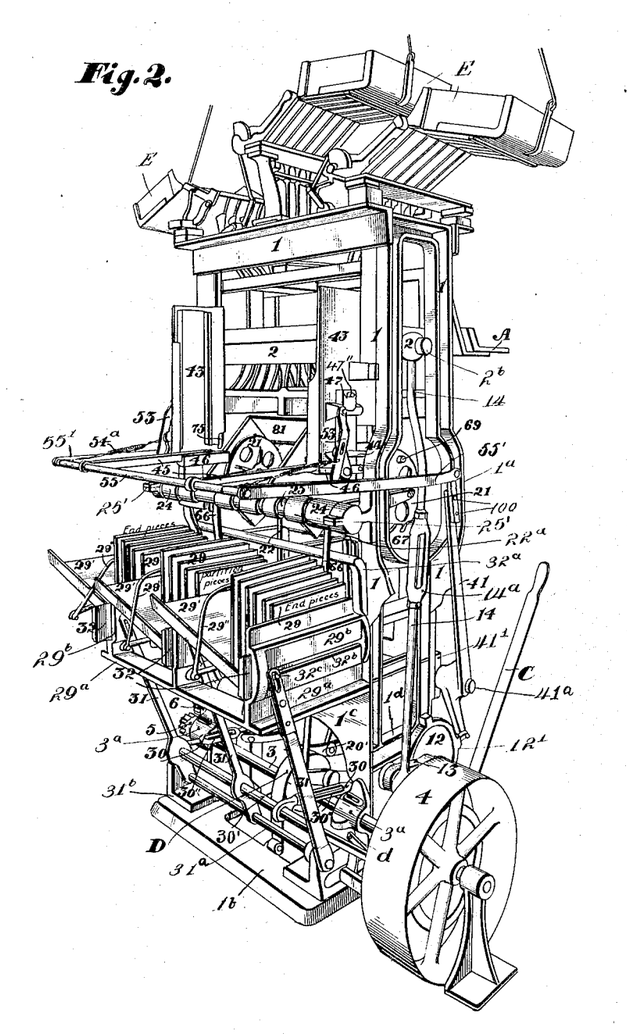
Figure 5:
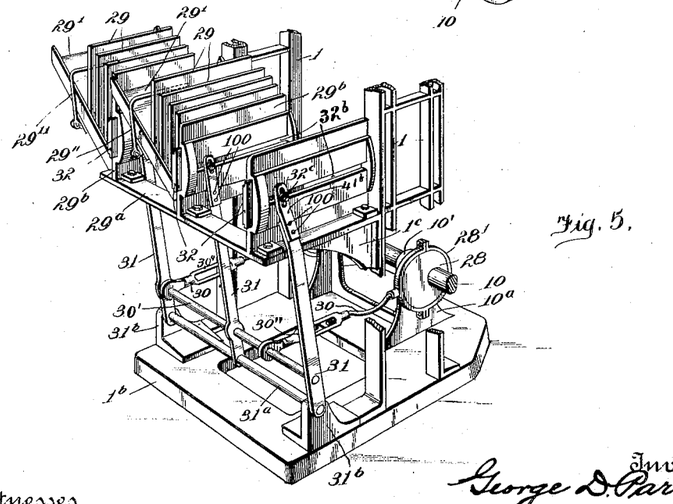
Fig. 5 is a perspective view of mechanism for feeding end and partition pieces.

Upon the rear side of the machine is a shelf $29^a$, Fig. 5, supported upon brackets $1^c$ approximately in the plane of the elevator members, the upper surface of the shelf and the upper edges of the members $33^b$, when the latter are in normal position, being in substantially the same plane. The shelf supports inclined chutes 29' in which, respectively, are placed the two sets of end pieces and the set of partition pieces, all of which are designated by the numeral 29, all of which stand on edge in planes practically parallel to the elevator members 33$^b$, and all of which are urged toward the lower ends of the chutes by springs 29''. The shelf is further provided with vertical plates 29$^b$ forming stops at the lower ends of the chutes and each provided with a suitable way to receive a slide 32 having a dog (not shown) to engage an end or side piece and push it edgewise inwardly upon the corresponding elevator member 33$^b$, with which the piece alines when pressed against the plate 29$^b$. In putting the pieces in the hoppers, their edges are, or may be, placed against an alining bar 32$^a$ (Fig. 2), fixed to the standards 1.

From each slide 32, a rigid stud 32$^c$ projects through a slot 32$^b$ in the corresponding plate 29$^b$ and is engaged by the slotted end of a rigid arm 31 fixed to a shaft 31$^a$ mounted in bearings in brackets 31$^b$ on the base 1$^b$. The arms are made up of two overlapped pieces connected by relatively fragile pins 100, so that any failure of the parts to feed properly will at most merely break the pins, which are readily replaced. The arms are moved positively back and forth by means of eccentrics 28 upon the shaft 10, eccentric straps 28', rods 30, and a bar 30' connecting all the arms together, and the distance through which they move outward may be regulated by means of turnbuckles 30''. Against one lateral face of each elevator member 33$^b$ rests a spring plate 35 which has a curved end 35' to guide the entering end or partition piece, said plate normally projects above said member, and is capable of vertical movement in guides 39 upon the same.

In lugs 38 at the lower side of each plate are secured pins 39' which pass downward through guides 39$^a$ and apertures 39$^b$ in the elevator base. The plates are normally held in their uppermost positions by springs 40 secured to the base and acting on the lugs 38. Guide plates 34 (Fig. 4) are located above the normal plane of the elevator and alongside the paths of the entering end and partition pieces, and in such position that said pieces enter between the plates 35 and these plates 34. Two vertical plates 36$^a$ are located in front and rear of the elevator, respectively, (Figs. 3, 4) and are each provided with vertical slots 77 corresponding in to the number of members 33$^b$ and located alongside the same but in each case upon the side opposite the corresponding plate 34. In each slot is a sliding block 76 to which is adjustably secured a pin 76$^a$ whose lower end is guided in an aperture 76'. Each pin bears a stop 79 which is adjustable and which is pressed upward by a spring 78 reacting against the bottom of the slot and thus resisting depression of the block. Each block is provided with a pintle 79$^a$ and upon the pintles of each pair of blocks is supported a heavy nailing base 36 whose wedge-like laterally projecting head 36' extends over the path of the entering end piece, 29, and is normally pressed against the plate 34 by a spring or springs 101. End and partition pieces having been pushed in between the plates 34, 35 to rest upon the members 33$^b$ below the overhanging heads of the nailing bases, the elevator is at once raised by means to be described.

The shaft 7 bears a loose clutch-member 15' and a clutch member 15 splined upon the shaft and thrown into and out of engagement with its companion by the end 16 of a lever centrally pivoted at 16$^a$ and having its opposite end swung back and forth by means of a groove 17' in a cam 17 on the counter shaft 10.

Figure 1:
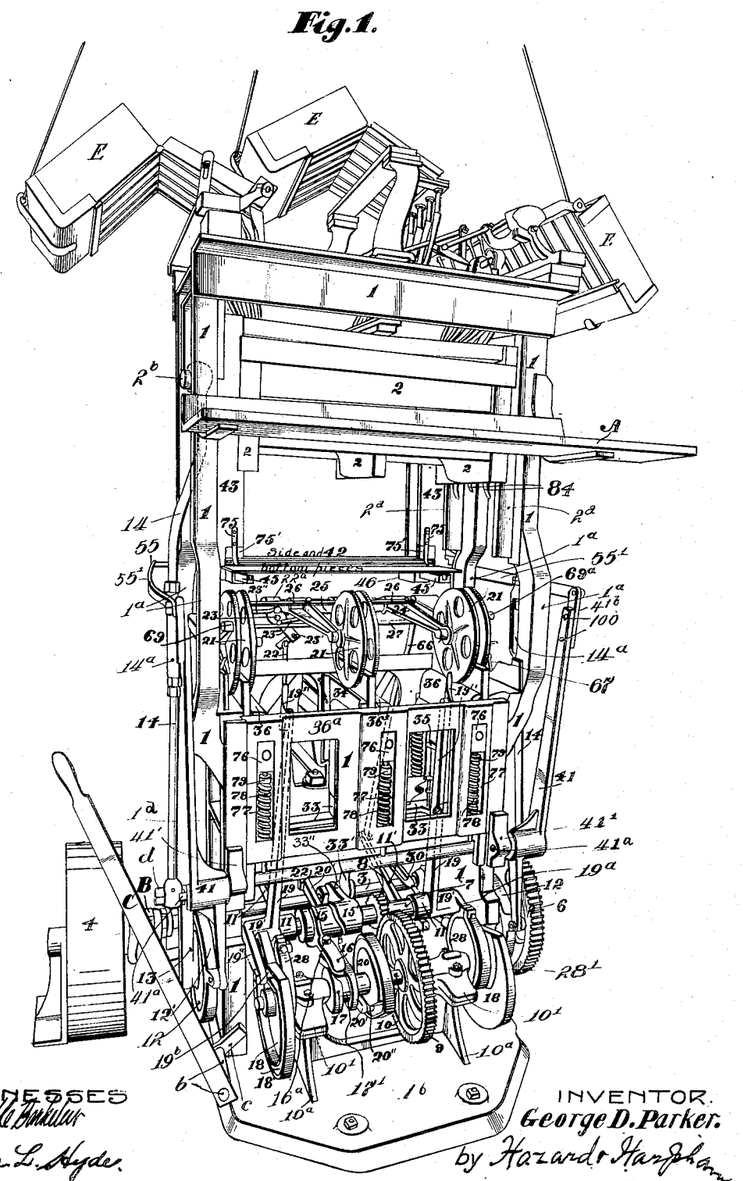
—Figures 1 and 2 are perspective views, showing, respectively, the front and the rear of the machine.
Figure 6:
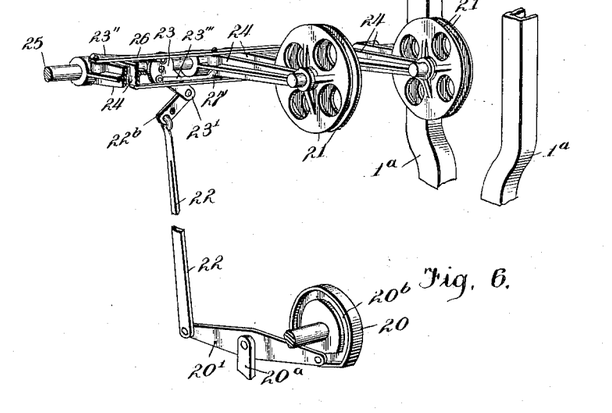
Fig. 6 is a perspective view showing certain clamps and their actuating mechanism.

The clutch member 15' carries a rigid arm 33'' which is connected by a link 33' to ears 33 on the base of the elevator. Obviously, when the clutch is thrown into engagement by the cam 17, the rotation of the shaft 7 in the proper direction swings the arm 33'' and lifts the elevator bodily. As it rises, the end and partition pieces 29 resting upon it press against the lower inclined surfaces of the nailing base heads 36' pushing them aside, the springs 101 yielding to permit the movement, and the next instant the wedge-like margins 35$^b$ of the plates 35 in like manner push past the heads. When the lugs 38 meet the lower portions 37 of the nailing bases, the plates cease to ascend, while the springs 40 yield and the elevator continues to rise. When the elevator has carried the pieces 29 high enough to permit the action, the nailing bases are swung beneath them, respectively, by the action of the springs 101, the members 33$^b$ being cut away at $a'$ to allow the entrance of the wedge-like heads 36' at the moment when the elevator reaches the upper limit of its path. In thus rising, the pieces 29 pass between sets of clamping disks 21 (Figs. 1, 6, 9) revolubly mounted upon the sides of arms 24 and lying nearly in the planes of the elevator members 33$^b$, respectively. At their opposite ends, the arms 24 are pivotally mounted upon a cylindrical rod 25 supported in bearings 25', and upon these arms rests a bar 26 secured to alternate arms, connecting them in a set, and below the arms is a parallel transverse bar 27 similarly connecting the remaining bars in a second set. Obviously longitudinal movement of either bar carries the disks of one set toward and away from their companion disks. Upon the rod 25 is a lug 22$^a$ to which is pivoted a plate 23, and this is connected to an arm of each set by oppositely moving, pitman-like links 23″, 23‴.

Figure 7:
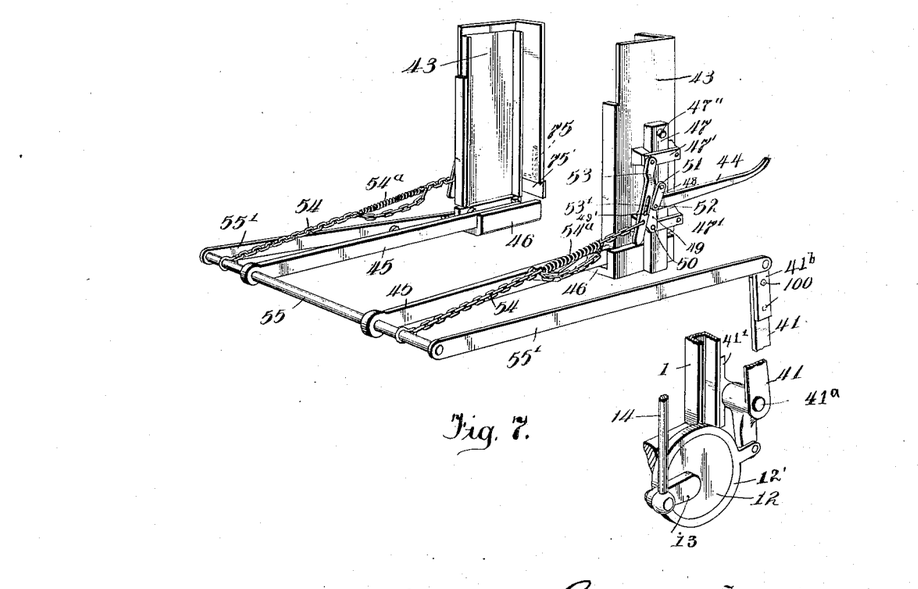
Fig. 7 is a perspective view of apparatus for feeding the side pieces.

The plate 23 has a projection 23′ and from this extends an oblique arm 22ᵇ whose free end is connected by a link 22 with one end of a lever 20′ centrally pivoted to fixed ears 20ᵃ on the main frame of the machine. The other end of this lever is swung back and forth by means of a groove 20ᵇ in a cam 20 on the counter shaft 10, the cam being such as to give a quick upward and downward, or clamping and releasing, movement and to maintain the clamping position during the greater portion of the interval required for one complete rotation of the shaft. The movements just described are so timed that when the entrance of the nailing bases beneath the several end and partition pieces has given each its proper support, each is instantly clamped and held fixed awaiting the attachment of side pieces. The side pieces are piled in a hopper or chute, in the rear of and above the clamped end and partition pieces, consisting of two U-shaped end guides 43 facing each other (Fig. 7) and each having a vertically adjustable bottom 46 carried by a bar 47 sliding in guides 47′ upon the outer faces of the end guides 43. Each bottom 46 is grooved above to receive the free end of an arm 45 which bears two clamps (Fig. 8), each adapted to seize and hold a side piece. The opposite ends of these arms are secured to a transverse rod 55 having its ends connected, respectively, by links 55′, to levers 41 pivoted at 41ᵃ to brackets 41′ and swung upon their pivots by eccentrics 12 whose straps 12′ are pivotally connected to the lower ends of the levers 41. By this means the arms 45 are caused to move back and forth longitudinally. For safety, the upper arm of the lever 41 is made in two parts which are connected by shearing pins 100.

Figures 4, 8, 9, 10, 11, 12, 13:
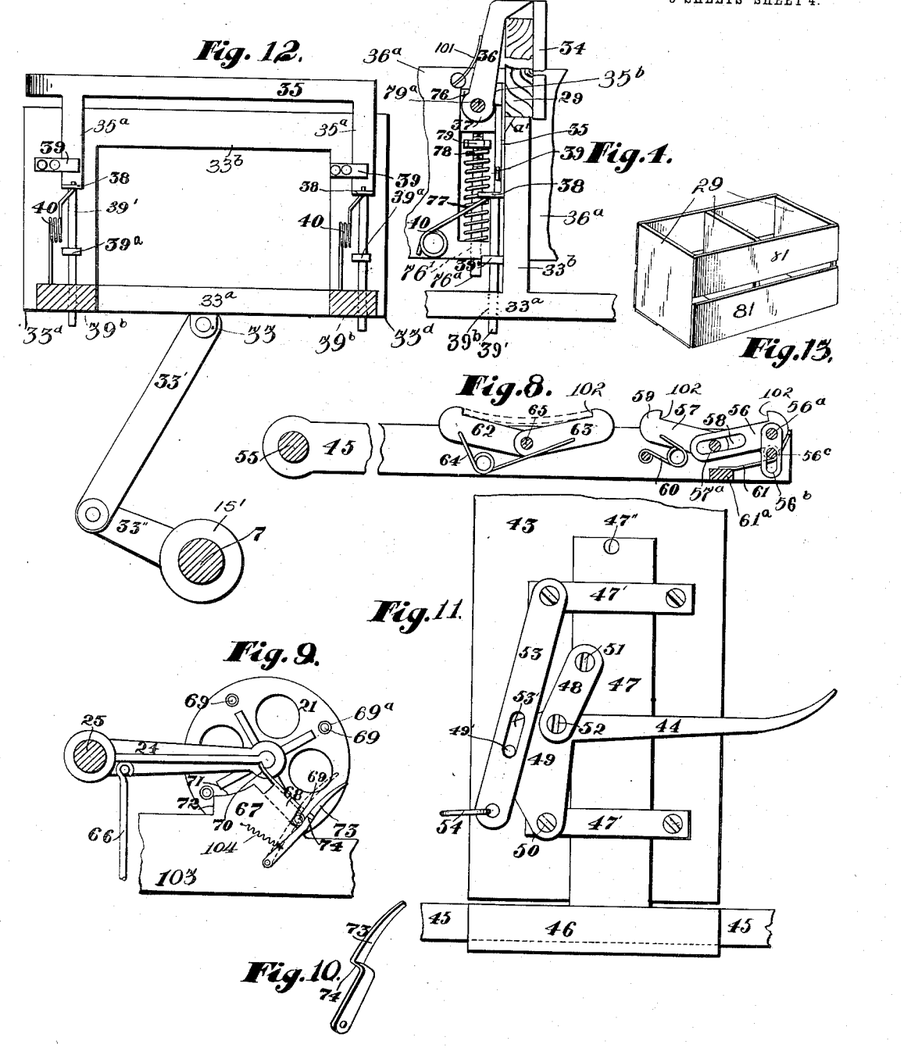
Fig. 4 is a side elevation of part of the elevator and certain co-acting nailing base devices.
Fig. 8 is a detail view showing the devices for grasping the side pieces.
Fig. 9 shows in side elevation the devices for rotating the partially completed boxes.
Fig. 10 is a detail view of a certain latch.
Fig. 11 shows means for lowering the side pieces upon the end pieces.
Fig. 12 is a sectional elevation showing the elevator and the devices which actuate it.
Fig. 13 is a perspective view of the box made by the machine.

The machine chosen for illustration uses two spaced side pieces for each side of the box, and hence each arm 45 has two spaced sidepiece clamps, as shown in Fig. 8. The terminal clamp consists of two fingers, 56, 57, having opposing offsets 102 in their upper edges and having their inner ends pivoted to the arm 45 at 57ᵃ. The fingers 56 are slotted at 58 to allow sliding and thus facilitate grasping boards of different widths. From the outer end of the arms 56 depend links 56ᵃ, slotted at 56ᵇ to pass over studs 56ᶜ around which bend spring 61 attached to lugs 61ᵃ on the arm 45 and tending to hold the free end of the finger above the arm 45,—an office performed for the arm 57 by a spring 60. For engaging the companion side piece of the set of two, similar fingers 62, 63 are pivoted at 65 and normally held raised by a spring 64. A warped board is shown in dotted lines as held between the offsets or shoulders 102 of these fingers, whose angle with each other varies, of course, with the widths of the boards which they grasp.

Side pieces being piled in the chute and the fingers 62, 63 being so far forward that they cannot grasp the lower board of the pile, the arms 45 are moved rearward by the action of the eccentrics 12. As the fingers 62 meet the pile of stock, the rounding of their ends causes them to swing downward and slide beneath the lower board until the offset 102 passes the rear edge of the latter, when the spring throws it upward into engagement with that edge. The offset in the companion arm engages the opposite edge in like manner and thus the continued movement of the arms 45 causes the bottom board to be pulled from beneath the pile and to be instantly replaced by the next board above it, since the pile descends through the action of gravity. This second board is engaged in the same manner by the fingers 56, 57 as the arms 45 continue to move rearward, but it is not wholly withdrawn from beneath the pile when the limit of rearward movement is reached. The arms now advance and carry both pieces to the front of the chute until they are in position immediately above the clamped end and partition pieces. During this movement, the second clamped side piece enters again beneath the pile before the first has fully passed therefrom, and as the offsets 102 have a depth less than the thickness of the boards, only friction tends to carry the lower unclamped board of the pile onward with the others. This unclamped board is prevented from advancing by a gate 75′ beneath which one board but not two superposed boards may pass freely. A spring 75 prevents this swinging of the gate under the frictional strain upon the lower unclamped board but yields and allows the gate to swing outward under the positive push of a thick board, should such a board be in the pile. The clamped side pieces after being thus advanced are normally held a little above the clamped end and partition pieces to which they are to be nailed, and to lower them the bottoms 46 which support the arms 45 are lowered, through the action of the descending nailing head which strikes the free ends of levers 44, pivoted at 50 to the guide upon the chute, or to other suitable support. To the head 49 of this lever a link 48 is pivoted, at 52, and also pivoted to the bar 47 at 51, whereby the descent of the free end of the lever pulls down the sliding bar 47 and thus lowers the member 46, supported by that bar and in turn supporting the arm 45 which carries the clamped side pieces. The head 49 also bears a stud 49′ which works in a slot 53′ in a bar 53 pivoted at one end to the guide 47′ or other fixed support and having its opposite end tied to the bar 55 by a flexible connection, shown as a chain 54 having interposed between its ends a strong spring 54ª, which being extended as the bottom is pulled down by the lever 44 lifts the bottom again to place as soon as the ascent of the nailing head permits, that is immediately after the completion of the descent, for the nailing head nails the side pieces fast the instant after they are lowered to place upon the end and partition pieces and then at once rises to normal position. As has been seen, each nailing base is supported by springs 78, and these are stiff enough to resist ordinary nailing pressure but they yield when the nailing head meets the wood after the nails are home; and indeed this is indispensable, for stock may vary in thickness and necessarily in nailing on the third side we have beneath it both the pieces to which it is nailed and the side first nailed to the same pieces. It may be noted here that when the arms 45 move rearward the springs 54ª are extended, ready to take up the slack of the chains when the arms move forward again, and also that the nailing head bears spring fingers 84 (Fig. 1) in position to adjust the side pieces accurately in position at the instant preceding the nailing. The first side having now been nailed in place, the structure must be turned 90° to bring the next side to position beneath the nailing head, and this is done by devices best seen in Fig. 9.
As has been stated, the clamping disks 21 are revolubly mounted on the arms 24 and the latter are formed into two sets by transverse bars connecting alternate arms. One disk of each set bears on its lateral face at quadrantal points, studs 69 provided with antifriction sleeves or rollers 69ª each of which in turn travels along an irregular portion 67 of a plate 103, fixed to the machine frame parallel to the planes of the disks, and is at the same time compelled to advance through an angular path of exactly 90°. To secure this result, the arms 24 are periodically raised and lowered by connecting rods 66 (Figs. 1, 9) whose lower ends are pivotally attached to arms 11' of a centrally pivoted lever whose opposite arms are actuated by cams 11 upon the shaft 7. The parts being in the positions illustrated in Fig. 9, upward swinging of the arm 24 compels the lower right hand stud to pass obliquely upward toward the left in a groove 68 in the plate 103 and then along the lower side of a projecting finger 70 of the plate, which presses it still farther to the left and beyond the end of the groove. The arm 24 then reverses its direction of movement and presses the stud upon the inclined edge 71 of the plate and forces it still farther to the left until it reaches the offset 72. Meantime, the next stud has descended against the end portion of a latch 73 provided with an offset 74, pivoted to the plate 103, and normally held in position to close the lower end of the groove 68 by a spring 104. This second stud pushes the latch aside while itself urged to the left thereby, and finally reaches the precise position occupied by the preceding stud at the beginning of the movement, when the disk will obviously have been rotated precisely 90°. As the arms of each set are all connected and rotate or swing together, all the clamps have been simultaneously rotated to the same extent and the partially formed box has been turned exactly 90°, while rising from and falling back upon the nailing bases, and is now in position to receive a second side or set of side pieces. These are added precisely as before, the box is again turned, and the third and last side is similarly added. At this moment, the cam 20 acts, releasing the clamping disks and leaving the box free upon the nailing bases. Immediately cams 18 (Fig. 1) on the counter shaft 10 eject the box from the machine, the cams acting through pins 19ᵇ in the cam grooves 18', arms 19ª projecting from sleeves 19' on the shaft 7, and arms 19 projecting upward from the same sleeve into the space in the rear of the box and having at their upper ends pushers suitably beveled at their ends. Simultaneously with the return of the ejectors to normal position, the elevator-raising clutch is disengaged and the elevator descends by gravity, the eccentrics 28 operate to again feed end and partition pieces, as at the outset, and thus the operation goes on rapidly, automatically and indefinitely so long as may be desired.

It is obvious that the constructions set forth may be varied without departing from my invention, and I therefore wish to claim the invention as broadly as the state of the art will permit.

The phrase "end pieces" is herein used, as is usual in the art, to designate the lateral box members to which two other lateral members or "sides" are nailed, regardless of the relative length of the two sets of members.

What I claim is:

1. The combination with a suitable frame forming a way, of an elevator sliding in said way and adapted to hold properly spaced a set of transverse box pieces, means for placing in said elevator such a set of box pieces, means for then raising the elevator, and means for then securing suitable side pieces upon the edges of said transverse box pieces.

2. In a box making machine, the combination with a box-board hopper having at its lower end a lateral passage capable of allowing the passage of two thin box-boards simultaneously, of means for forcing the lowermost board out through said passage, and an obstruction arranged in the path of the uppermost of such boards to prevent its moving out under the frictional impulse of the lower board and to yield under the stronger pressure exerted directly upon it by a thicker lowermost board; whereby boards, thick or thin, are passed out singly.

3. In a box making machine, the combination with means for holding a set of transverse box pieces, of a side piece hopper above the plane of the transverse pieces held by said means, devices for carrying the lowermost side piece horizontally from the hopper to a point directly above said transverse pieces, means for then lowering the side pieces upon the transverse pieces, and means for securing the side pieces to the transverse pieces.

4. The combination with nail driving devices, of means for holding in position a set of end pieces, means for advancing side pieces into registry with said end pieces and near the edges thereof to which they are to be nailed, and means whereby the advancing nail driving devices move said side pieces into contact with said edges.

5. In a box making machine, the combination with means for holding a set of spaced transverse box pieces in registering position, of a corresponding set of laterally movable nailing bases arranged to support simultaneously the transverse pieces, respectively, means for placing side pieces upon the transverse pieces, and means for simultaneously nailing the side pieces to all the end pieces.

6. The combination with nailing devices, of means for holding a set of end pieces in proper position for forming a box and in the line of motion of said devices, a side piece hopper at one side of said line, an arm reciprocating between the hopper and said means, a clamp borne by said arm and adapted to engage the lowermost piece in said hopper and carry it forward into registry with said means, and mechanism for swinging said arm toward said means at the end of its advance.

7. In a machine of the class described, the combination with an elevator normally below the space in which boxes are formed, of automatic means for placing a properly spaced set of end pieces upon said elevator, automatic means for raising the elevator into said space, automatic means for advancing side pieces into position for nailing to said end pieces, and automatic means for nailing said side pieces in place.

8. In a machine of the class described, the combination with hoppers arranged to hold series of end pieces on edge with the foremost piece of each series in the plane it is to occupy when the side pieces are added, automatic means for simultaneously pushing all said foremost pieces laterally into the position they are to occupy during the time when the side pieces are being added and automatic means for then adding the side pieces.

9. In a machine of the class described, the combination with a set of end-piece hoppers each inclined and adapted to contain a series of pieces with the lowermost in the plane it is to occupy while the side pieces are being added, pivoted arms, means carried by the arms, respectively, for engaging and moving said lowermost pieces edgewise into position for nailing side pieces thereto, and eccentrics arranged to simultaneously actuate all the arms at proper intervals.

10. The combination with a nailing head, of nailing bases normally in the line of the head's movement, means for placing end pieces upon said bases, mechanism for advancing side pieces horizontally to position slightly above said end pieces, vertically movable devices supporting said mechanism, and means whereby the descending head causes said devices to descend, lowering the side pieces to rest upon the end pieces.

11. The combination with a nailing head and nailing bases normally in the line of the head's movement, of means for placing transverse box pieces in position upon said bases, means for advancing side pieces to position alongside said transverse pieces, laterally and vertically movable devices supporting the side pieces above the end pieces, means whereby the advancing head actuates said devices and moves the side pieces against the end pieces, and springs yieldingly resisting such movement.

12. The combination with means for simultaneously advancing a set of transverse box-pieces to position, of pairs of clamping plates in position to receive said pieces, respectively, devices uniting alternate plates to form two sets each movable as a whole, and automatic means for moving the plates of one set toward their companions to clamp the advanced end pieces.

13. The combination with a set of vertically movable rotary clamps adapted to grip a corresponding set of transverse box pieces, respectively, automatic means for raising and lowering said clamps bodily at suitable intervals, automatic means for imparting a limited rotary movement to said clamps while they are raised, and automatic means for causing said clamps to grip and to release the transverse pieces at predetermined times.

14. In a machine of the class described, the combination with a shaft, of a series of arms loosely mounted upon the shaft, clamping plates borne by the arms, respectively, and forming pairs of co-acting plates, devices connecting alternate arms to move laterally as a whole, automatic means for advancing transverse box pieces to position between the pairs of plates, and automatic means for then swinging the connected arms toward their companions, to clamp the interposed box pieces.

15. The combination with a nailing head and means for reciprocating the same, of a nailing base normally in position to receive the thrust of nailing and mounted for movement in the direction of such thrust and in a direction transverse thereto, means for moving said base laterally out of supporting position, and devices offering yielding resistance to each of those movements.

16. The combination with an elevator adapted to support a set of transverse box pieces, means for raising and subsequently releasing the elevator, nailing bases arranged to be pushed aside as the elevator rises and to swing beneath the pieces carried thereby as the elevator reaches its highest point.

17. In a box making machine, the combination with means for holding a set of transverse box pieces properly spaced in parallel planes, of a set of nailing bases for supporting said transverse pieces, respectively, and means whereby said bases may be automatically depressed to compensate unusual thickness of side pieces and the addition of another side piece after the first has been secured upon the opposite edges of the transverse pieces.

18. In a box making machine, the combination with means for holding a set of transverse box pieces, of a corresponding set of nailing bases arranged to move into and out of the planes of the transverse pieces, respectively, to support the latter, automatic means for placing three sets of side pieces upon three sides, respectively, of the transverse pieces, automatic means for simultaneously nailing the side pieces of each set to all the transverse pieces, and automatic means for raising the transverse pieces, rotating them 90°, and returning them to the base pieces after each of the first two sets of side pieces is added.

19. In a box making machine, the combination with a set of rotary clamps for holding a corresponding set of transverse box pieces, respectively, of automatic means for simultaneously rotating said clamps in their own planes, and automatic means for simultaneously releasing all said box pieces after a predetermined amount of rotary movement.

20. In a box making machine, a clamp adapted to grasp a board by its opposite edges and consisting of two co-acting spring actuated fingers pivoted below the plane of the board to be seized and normally projecting obliquely upward in divergent directions; whereby boards of various widths, warped or otherwise, may be grasped and securely held.

21. In a box machine, a clamp adapted to grasp a board by its opposite edges and consisting of two co-acting spring actuated fingers each pivoted below the plane of the board to be seized and one being slotted to allow longitudinal sliding upon its pivot, whereby it is virtually lengthened permitting an unusually wide board to be clamped.

22. For removing boards from the bottom of a pile placed in a hopper open at the bottom upon one side, the combination with a longitudinally reciprocating arm slightly below the hopper, of a pair of co-acting fingers pivoted to the arm below its upper side, provided with slight grasping offsets, and normally having their free ends held above said side by spring pressure, said ends being provided with outer inclined surfaces whereby the movement of the arm in either direction brings an inclined surface of the foremost finger against the edge of the board to be grasped causing the finger to yield and pass beneath the board.

23. For removing boards in pairs from the bottom of a pile in a suitable hopper, the combination with an arm reciprocating slightly below the lowermost board, of two clamps less than a board's width apart and each consisting of a pair of co-acting spring actuated fingers pivoted to the arm below its upper side and normally having their free ends above said side.

24. In a box making machine, the combination with devices for holding a suitably spaced set of transverse box pieces, of automatic means for sliding into said devices, simultaneously, a set of such pieces, a corresponding set of clamps above said set when placed in position, automatic means for raising the pieces into said clamps, respectively, automatic means for placing a nailing base beneath each raised piece, and automatic means for then securing side pieces to three sides of said transverse pieces.

25. In a box making machine, the combination with a pivoted arm and means for swinging it back and forth upon its axis, of a clamping plate rotatably mounted upon the arm and provided with a projection upon its lateral face at some distance from its axis, a plate fixed alongside the clamping plate and provided with a way adapted to receive said projection and compel rotation of the clamping plate upon its own axis as the arm swings back and forth.

26. In a box making machine, the combination with a pivoted arm and means for swinging it back and forth, of a clamping plate revolubly mounted upon the free end of the arm and provided with antifriction rollers at quadrantal points upon its lateral face, the plate fixed alongside the clamping plate and provided with a way to receive the rollers in succession and compel the rotation of the clamping plate upon its own axis when the arm swings back and forth, and a yielding arm provided with a locking offset and arranged to be pushed aside by one of said rollers while the next preceding roller is advancing in said way, and to lock the roller which actuates it against return movement when that roller in its turn reaches said way.

27. In a machine of the character described, means for feeding spaced transverse box pieces, and means for holding the same during the attachment of side pieces thereto; said latter means comprising spaced pairs of rotatable disks, pivoted arms supporting said disks respectively, spaced rods slidably connected with said arms, springs and stops upon said rods and bearing upon said arms, and means for moving said rods endwise oppositely comprising an intermediately pivoted lever, links connected with said lever and connected respectively with said rods, and means for oscillating said lever.

28. In a machine of the character described, means for feeding spaced transverse box pieces, and means for holding the same during the attachment of side pieces thereto; said latter means comprising spaced pairs of rotatable disks, pivoted arms supporting said disks respectively, spaced rods slidably connected with said arms, springs and stops upon said rods and bearing upon said arms, and means for moving said rods endwise oppositely comprising an intermediately pivoted lever, links connected with said lever and connected respectively with said rods, and means for oscillating said lever, and means for turning the disks to partially invert the work held thereby.

29. In a machine of the character described, means for feeding spaced transverse box pieces, and means for holding said box pieces during the addition thereto of side pieces, and means for partially inverting the work, comprising spaced rotatable disks between which the transverse box pieces are fed, tension means causing the disks to grip the box pieces, a plate located adjacent to said disks and having an irregularly formed portion, projections upon one of said disks co-acting with said plate, and means for relatively moving said plate and said disks whereby said disks are rotated.

30. In a machine of the character described, means for feeding spaced transverse box pieces, and means for holding said box pieces during the addition thereto of side pieces, and means for partially inverting the work, comprising spaced rotatable disks between which the transverse box pieces are fed, tension means causing the disks to grip the box pieces, a plate located adjacent to said disks and having an irregularly formed portion, projections upon one of said disks co-acting with said plate, and means for relatively moving said plate and said disks whereby said disks are rotated; said plate being provided with a curved latch having an offset portion and serving to direct said projections to the irregularly formed portion of said plate.

31. In a machine of the character described, a chute or hopper for feeding box side pieces, spaced arms upon which the box side pieces are disposed, nailing heads for connecting the box side pieces with the other portion of the box structure, means for moving said arms endwise, and means for releasing said arms to permit downward movement of the same.

32. In a machine of the character described, a chute or hopper for feeding box side pieces, spaced arms upon which the box side pieces are disposed, nailing heads for connecting the box side pieces with the other portion of the box structure, means for moving said arms endwise, and means for releasing said arms to permit downward movement of the same; said latter means being operated by the nailing heads in their movement.

33. In a machine of the character described, means for feeding spaced transverse box pieces, an elevator for presenting said transverse box pieces in position for receiving box side pieces, and operating means for said elevator comprising a rotatable shaft, clutch members upon said shaft and one of which is splined thereto, a crank connection between one of said clutch members and the elevator, and means for moving the splined clutch member upon the shaft.

34. In a machine of the character described, chutes for feeding transverse box pieces, and means for transferring said pieces from said chute comprising a slotted plate embodied in the chute construction, a slide transversing said slotted plate, a stud connected with said slide and operated in the slot in said plate, an arm operating the stud, and a spring dog carried by the slide and arranged for engagement with said pieces to urge the same from said chute.

35. In a machine of the character described, means for feeding spaced box pieces, and means for holding the same during attachment of other box pieces thereto; said latter means comprising spaced members between which the first-mentioned box pieces are fed, means for causing said spaced members to grip the box pieces, and means for imparting motion to said spaced members.

36. In a box making machine, the combination with means for holding a set of spaced transverse box pieces in registering position, of a corresponding set of laterally movable nailing bases arranged to support the transverse pieces, respectively.

37. The combination with a nailing head, of nailing bases normally in the line of the head's movement, means for placing end pieces upon said bases, mechanism for advancing side pieces horizontally to position slightly above said end pieces, vertically movable devices supporting said mechanism, and means whereby the descending head causes said devices to descend, lowering the side pieces to rest upon the end pieces.

38. An automatic box making machine having a mechanism for feeding in end pieces to spaced position, a mechanism for then tranferring the spaced end pieces away from their feeding mechanism and into nailing position, and mechanism for then carrying side and bottom pieces to position for nailing to the end pieces by nailing mechanism, and said nailing mechanism.

39. In a machine of the character described, means for feeding spaced transverse box pieces, means for holding said box pieces during the addition thereto of side pieces; and means for partially inverting the work, comprising spaced rotatable disks between which the transverse box pieces are fed, means for causing the disks to grip the box pieces, and means for rotating said disks.

40. In a box making machine, the combination with means for holding a set of suitably spaced transverse box pieces; of means for feeding side pieces into position for connection with said pieces, and means for so connecting the side pieces with the transverse box pieces; said means for feeding the side pieces comprising longitudinally and vertically movable supports, and means limiting the supports normally to longitudinal movement.

In witness that I claim the foregoing I have hereunto subscribed my name this 25th day of April, 1904.

GEO. D. PARKER.

Witnesses:
   THEO D. HEWITT,
   H. B. HENDERSON.